May 8, 1951  A. J. FINDLAY  2,551,933
TIME CLOCK RECORDING APPARATUS
Filed March 18, 1946  7 Sheets-Sheet 1

*Fig. 1.*

INVENTOR
A. J. FINDLAY,

BY Featherstonhaugh & Co
ATTORNEYS

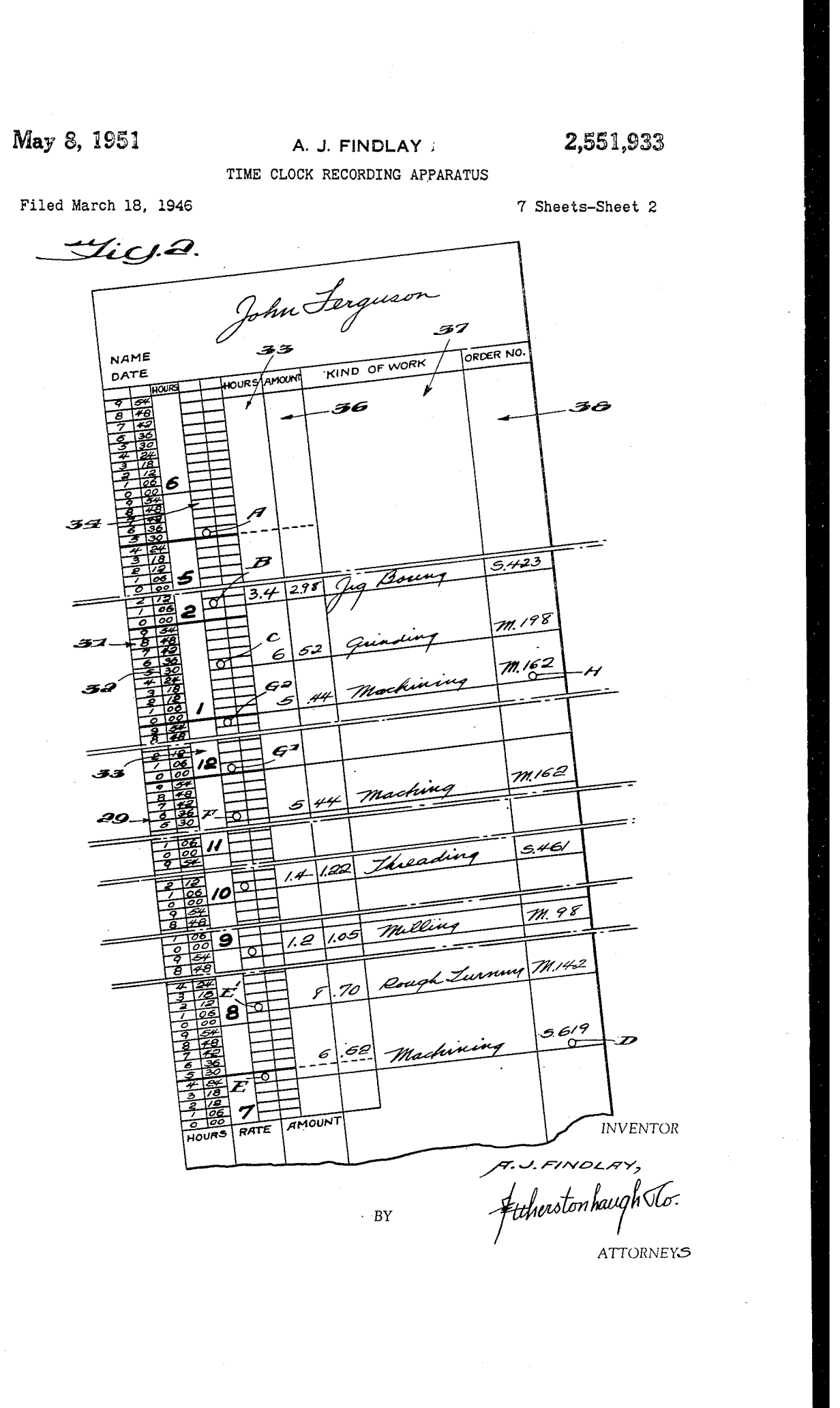

May 8, 1951     A. J. FINDLAY     2,551,933

TIME CLOCK RECORDING APPARATUS

Filed March 18, 1946     7 Sheets-Sheet 2

INVENTOR
A. J. FINDLAY,
BY Fetherstonhaugh & Co.
ATTORNEYS

May 8, 1951 A. J. FINDLAY 2,551,933
TIME CLOCK RECORDING APPARATUS
Filed March 18, 1946 7 Sheets-Sheet 3
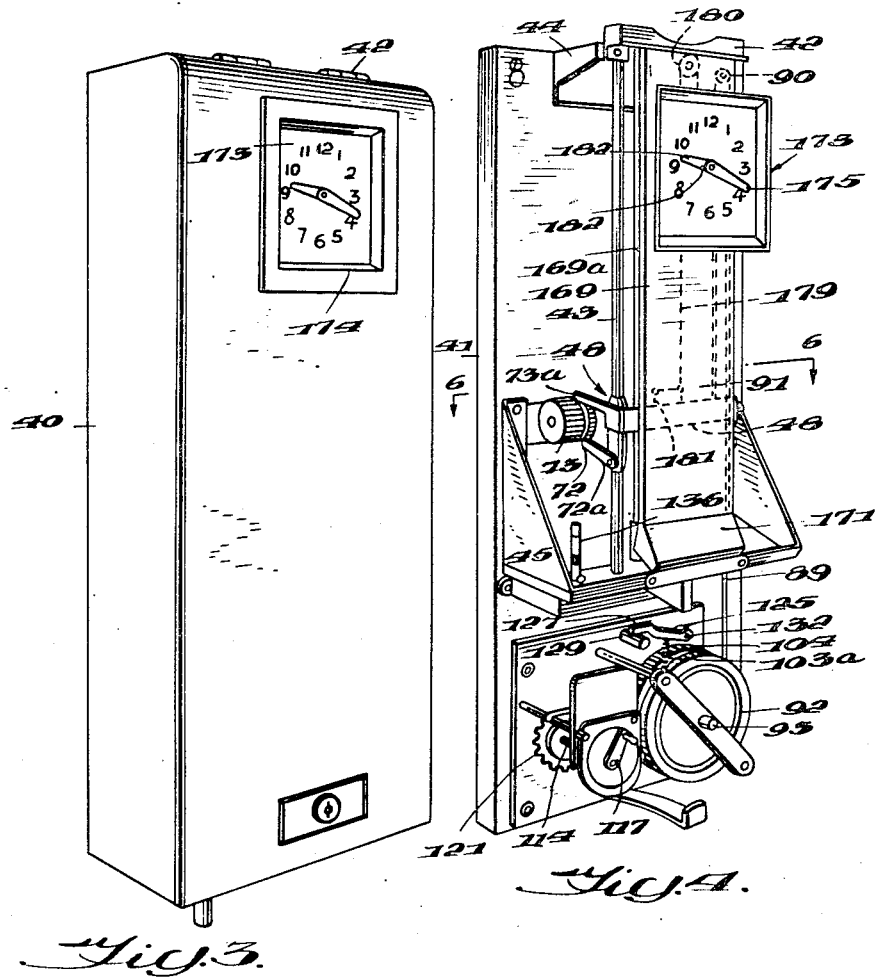
INVENTOR
A. J. FINDLAY,
BY Featherstonhaugh & Co.
ATTORNEYS

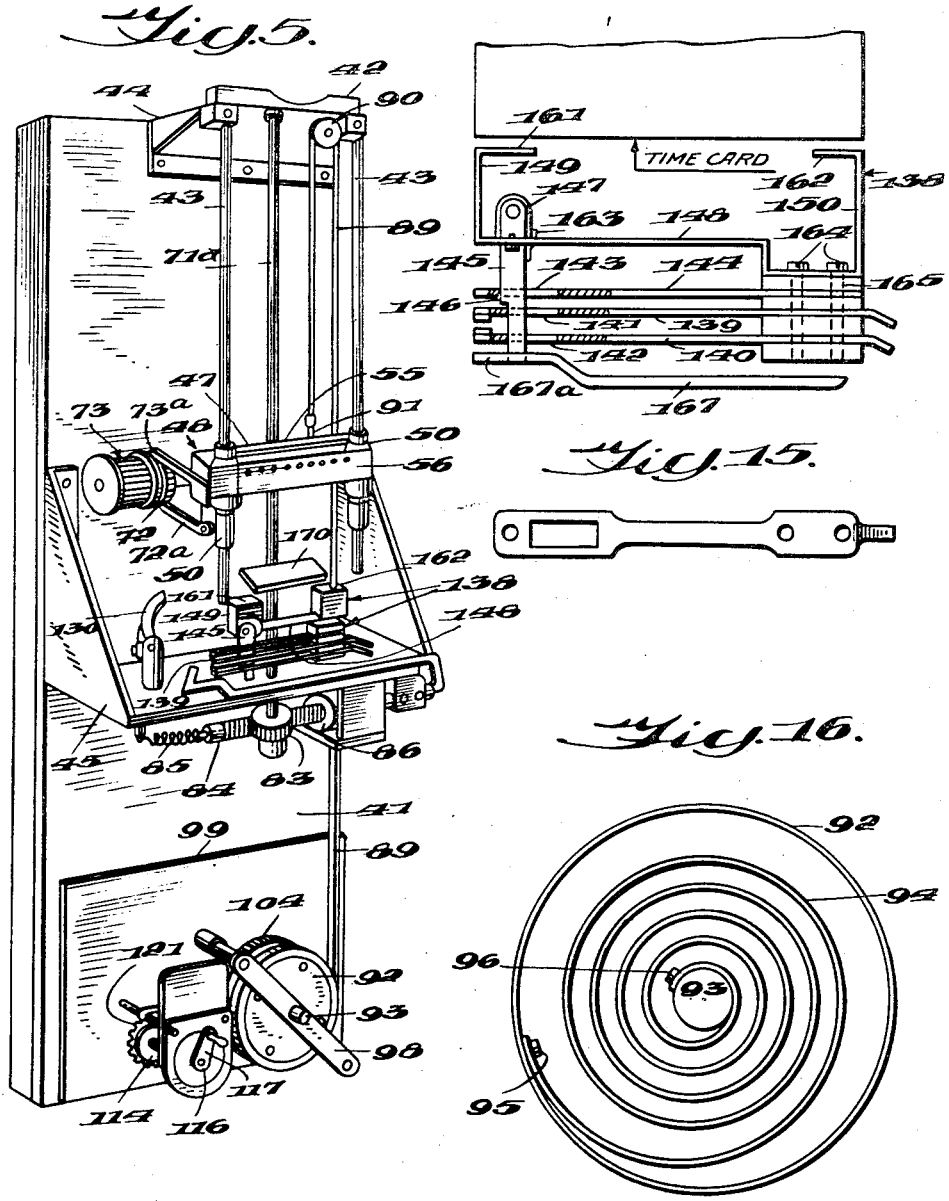

May 8, 1951     A. J. FINDLAY     2,551,933
TIME CLOCK RECORDING APPARATUS
Filed March 18, 1946     7 Sheets—Sheet 5
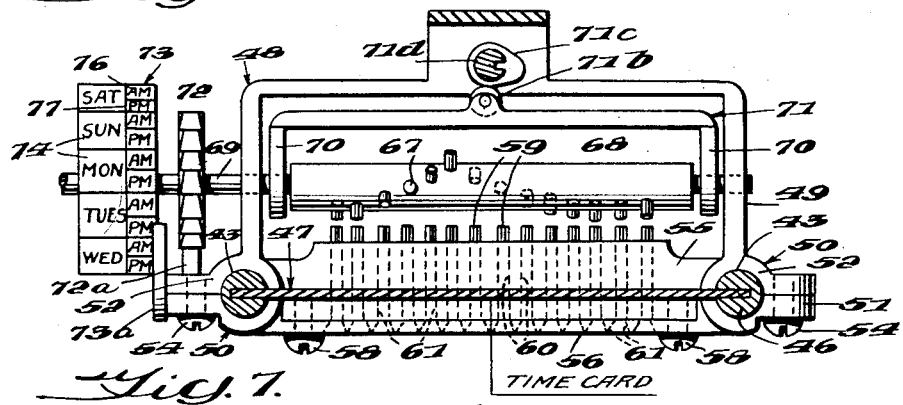
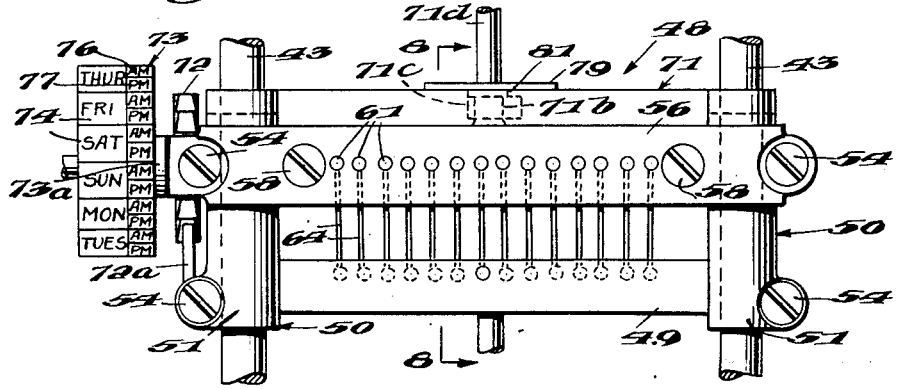
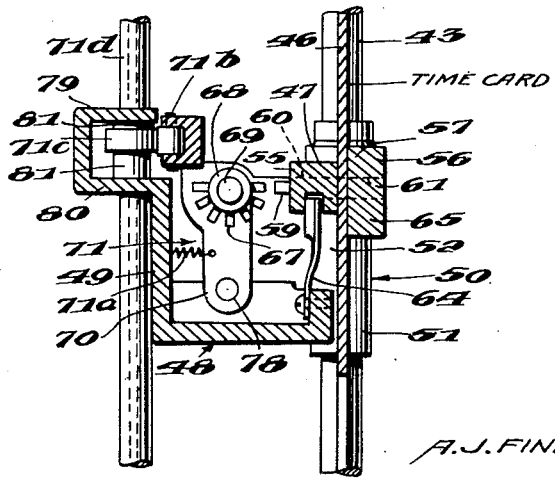
INVENTOR
A. J. FINDLAY,
BY
ATTORNEYS

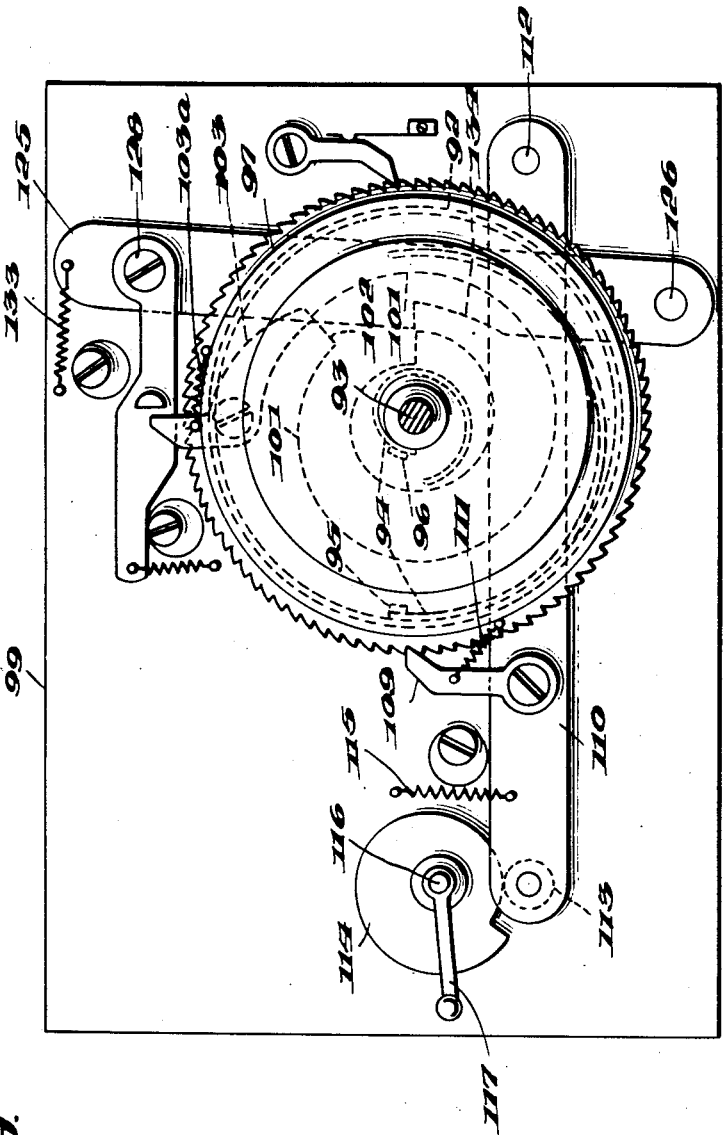

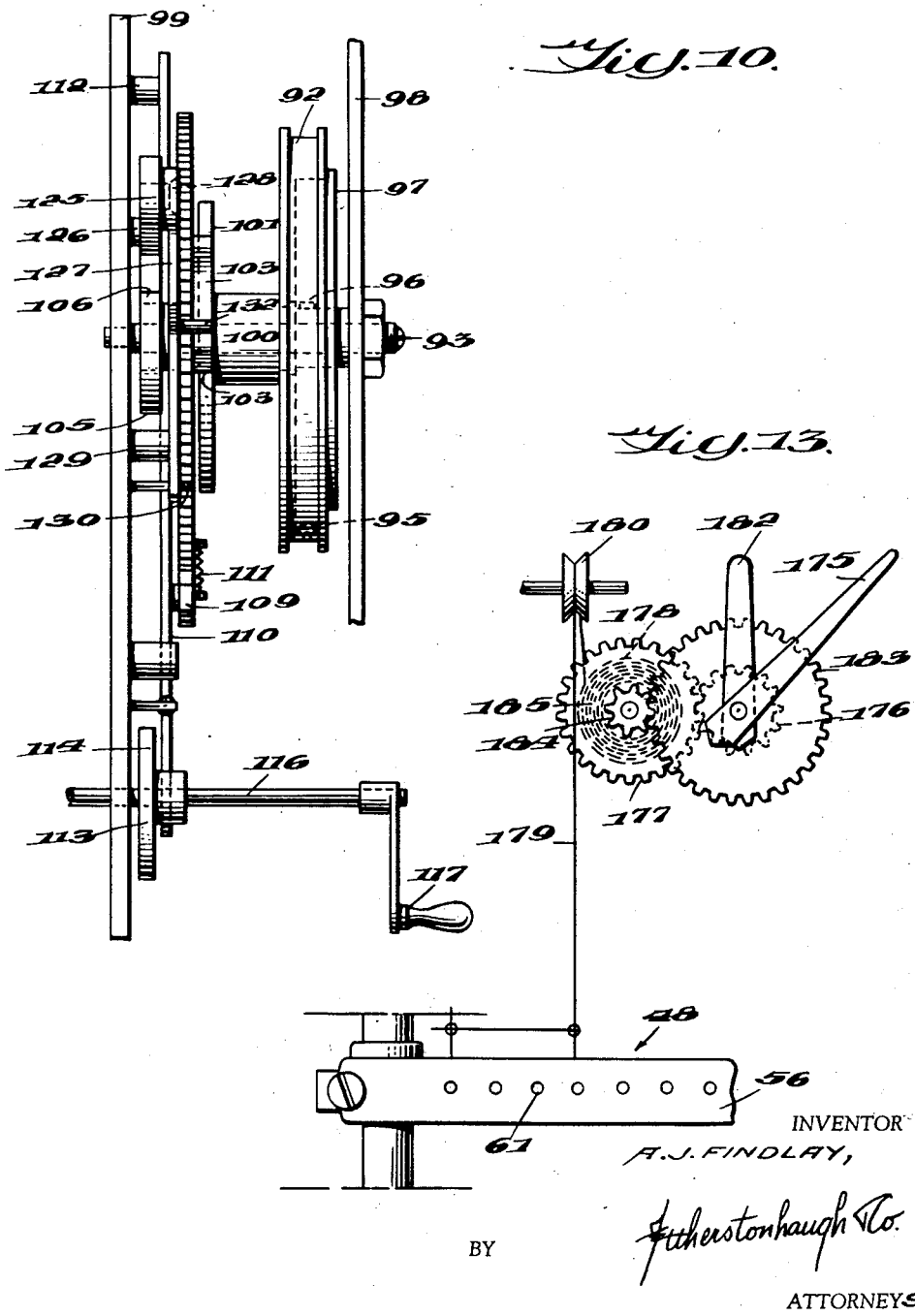

Patented May 8, 1951

2,551,933

UNITED STATES PATENT OFFICE 2,551,933

TIME-CLOCK RECORDING APPARATUS

Albert James Findlay, Montreal, Quebec, Canada

Application March 18, 1946, Serial No. 655,305

8 Claims. (Cl. 346—17)

This invention relates to improvements in the time-clock recording of starting and stopping times on an employee's time card and is a continuation, in part, of the invention set forth in my co-pending application Serial No. 592,251, filed May 5, 1945, now Patent No. 2,476,717, granted July 19, 1949.

According to the invention described in said co-pending application, the employee's time card is provided with a preprinted time schedule graduated in hours and minutes and also in hours and tenths of hours, the graduations being arranged so that starting and stopping time indicating holes punched in the card by a time clock can be read in hours and minutes by the employee and in hours and tenths of hours by the clerk when computing pay roll and labor costs, labor distribution and other items. The employee's starting and stopping time indicating holes are punched in the card by the time clock at different times so that; subject to correction for early or late time-clock punchings marking the beginning and end of a working period, or punchings including the noon hour or other nonchargeable time; the duration of the working period shown on the card is measurable as a function of the lineal distance between the punched holes indicating, respectively, the beginning and end of that particular period.

The present invention resides in the provision of a simple, accurate and efficient time recording clock for punching the aforesaid starting and stopping time indicating holes in the employee's time card and comprises certain novel features and combinations of features as set forth in the detailed description of the accompanying drawings showing a preferred embodiment of said invention.

In the drawings:

Fig. 1 is a view of a preferred type of employee's pay roll card which is preprinted and punched in accordance with the present invention. This view shows the preprinted time schedule and the manner in which the employee's starting and stopping times are recorded by time clock recording holes punched in the card. This view also shows the manner in which the time and labor calculations arrived at with the aid of the starting and stopping time indicating holes punched in the card are manually posted on the card. This view also shows certain control holes which are useful when the employee's working time is computed from the card record with the aid of the computing apparatus described in my said co-pending application.

Fig. 2 is a view similar to Fig. 1, but showing a preferred type of employee's job costing card provided with a preprinted time schedule and control holes similar to those shown in Fig. 1. This figure also shows the manner in which starting and stopping time indicating holes are punched in the job costing cards, as well as the manner in which the time and labor costs are calculated for each job from the time the card records are manually posted in appropriate posting columns provided on the card.

Fig. 3 is a perspective view of my improved time recorder.

Fig. 4 is a view similar to Fig. 3, with the cover casing of the recorder removed to show certain interior parts.

Fig. 5 is a view similar to Fig. 4 with further parts of the recorder removed to disclose other parts that would otherwise be hidden from view.

Fig. 6 is a sectional view taken substantially along the section line 6—6 of Fig. 4 and shows, in plan, the component parts of a card punching mechanism forming part of said recorder.

Fig. 7 is a front elevation of the card punching mechanism shown in Fig. 6.

Fig. 8 is a sectional view taken substantially along the line 8—8 of Fig. 7.

Fig. 9 is a front elevational view of a time-controlled mechanism which governs the positioning of the card punching mechanism shown in Figs. 6 to 8 inclusive.

Fig. 10 is a plan view of the time-controlled mechanism shown in Fig. 9.

Fig. 11 is a detail view of a drive mechanism forming part of the time-controlled mechanism shown in Figs. 9 and 10.

Fig. 12 is an end view of the assembly shown in Fig. 11.

Fig. 13 is a detail view showing mechanism whereby the hands of a clock forming part of said recorder are operated from the time-controlled mechanism through the agency of the card punching mechanism.

Fig. 14 is a detail view of a card actuated switch mechanism through the agency of which the recorder is operated in response to the insertion of a time card therein.

Fig. 15 is a plan view of a component element of the assembly shown in Fig. 14.

Fig. 16 is a sectional view of a spring drum forming part of the time controlled mechanism shown in Figs. 9 to 12 inclusive.

The "payroll" card 5, shown in Figs. 1 and 8, is ruled to provide a series of vertical columns which, reading from left to right, include a "tenths" column 6, an "hour" column 7, a "minutes" column 8, seven daily double-entry time-recording columns 9, 10, 11, 12, 13, 14 and 15, a "deductions" column 16 and a second "hour" column 17.

The "tenths" column 6 is divided horizontally into 120 spaces, each representing one-tenth of an hour in time or one-tenth of an inch in lineal distance. The adjacent "hour" column 7 is divided horizontally into 12 equal spaces, each representing one hour. The "minutes" column 8 is divided into 120 spaces, each representing six minutes or one-tenth of an hour. The 120 spaces of the columns 6 and 8 are aligned and appropriately designated so that fractions of hours can be read in terms of tenths in column 6 or in terms of minutes in column 8. Each of the horizontal dividing lines of the hour column 7 represents a definite hour as indicated by the numeral appearing thereabove. The horizontal division lines of columns 6, 7 and 8 are continued across the daily time-recording columns 9 to 15 inclusive, so that each of the latter columns is also divided into 120 spaces aligned with the spaces of columns 6 and 8.

Each of the daily time-recording columns 9 to 15 inclusive, is divided vertically into day and night sections respectively indicated by the headings A. M. and P. M. These columns, reading from left to right, cover a period of seven days beginning with Monday as indicated by the printed headings.

For present purposes it will be assumed that the official daily working-time schedule runs from 7.30 A. M. to 12.00 noon and from 1 P. M. to 5.30 P. M. These official starting and stopping times are respectively indicated on card 5 by heavy ruled lines 19, 20, 21 and 22. The regular working-time, usually called "company's time," is indicated by an oblique line 23 extending from the morning starting time of 7.30 A. M. to the morning stopping time of 12.00 noon and a second oblique line 24 extending from the afternoon starting time of 1.00 o'clock to the afternoon stopping time of 5.30 P. M. Any time recorded on the card within the fields traversed by the oblique lines 23 and 24 is either late or short time and must be deducted from the regular working-time schedule. The fields traversed by the diagonal lines 25 and 26 are employees' time while the field traversed by the diagonal line 27 may be either employees' time or official overtime.

The circles designated M and N represent control holes which are punched in the right hand side of the card and are used for the purpose described in my said co-pending application Serial No. 592,251. The hole M is aligned with and identifies the official afternoon starting time of 1.00 o'clock. The hole N is aligned with and identifies the official starting morning time of 7.30 o'clock. The additional circles appearing in certain of the daily time-recording columns represent time-recording holes which have been punched in the card by a time-recording clock to indicate the work-starting and work-stopping times recorded by the employee whose name and number appear at the top of the card.

The calculations posted at the bottom of card 5 are based on a schedule of nine working hours a day of five days (Monday, to Friday inclusive) and five and a half hours on Saturday, thus making a total of fifty and one-half hours for the pay period. In this connection it is assumed that employee No. 126 is working for a concern which pays overtime, at time and a half, after 48 hours have been worked and that, in accordance with conventional late time deduction practice, deductions of one-quarter hour are made for every late recording up to 12 minutes, with the same deduction for early quitting or stopping-time recordings.

When card 5 is studied in the light of the foregoing explanations, it will be seen that employee No. 126 punched four times in the "company's time" so as to be liable to a deduction of four quarter hours amounting to one hour short time which, deducted from the scheduled 50½ hour pay period, leaves a total of 49½ hours worked (48 hours' regular time and 1½ hours' overtime). Since time and a half rate equals one and one-half hours of regular rate it follows that 48 hours' regular time, plus one and one-half hours at time and a half equals fifty and one-quarter hours of regular time for which employee No. 126 is entitled to $43.97 at the pay rate of 87½ cents per hour.

The "job-costing" card 29 (Fig. 2) shows the distribution of work done by employee 126 for a 9-hour work day. The manual postings appearing on this card represent the "time" and money value of the labor applied to each particular job.

Card 29 is ruled to provide a series of vertical columns which, reading from left to right, include a "tenths" column 31, a "minutes" column 32, an "hours" column 33, a double entry "time-recording" column 34, a "time-posting" column 35, a "labor-cost posting" column 36, a "job-title posting" column 37, and an "order No. posting" column 38.

Columns 31, 32 and 33 of card 29 correspond to columns 6, 8 and 7 of card 5 but are in different relative positions. Column 34 of card 9 is similar to the columns 9 to 15 of card 5. The circles H and D shown on card 29 represent control holes corresponding, respectively, to the control holes M and N of card 5. The additional circles shown in the time-recording column 34 of card 29 represent time-recording holes punched in the card by a time-recording clock to record the starting and stopping times of the different jobs worked on by employee No. 126. Each hole indicating the stop time of one job also indicates the starting time of the next job when the latter is started immediately. In the case where a new job is not commenced immediately after finishing the preceding job, a new starting time hole can be punched in the card to indicate the starting time of the new job and the idle time between the starting of the new job and the finishing of the preceding job should be calculated as "non productive" time to first balance the total working hours and to prevent idle time being charged to the new job.

The time-recording holes A and B punched in card 29 indicate, respectively, the stopping and starting times of the jig-boring job S—423 which was the last job worked on by employee No. 126. These holes show that job S—423 was started at 2.06 P. M. and finished or stopped at 5.30 P. M., the official stopping time of the prescribed working schedule. Job S—423 therefore requires 3 and $\tfrac{4}{10}$ hours of labor which, at the stipulated pay rate of 87½¢ an hour, represents a labor cost of $2.98. These calculations of time and labor cost, together with the job-title and order number, are posted in the appropriately headed posting columns and preferably opposite the starting time of the job.

The 2.06 P. M. starting time of job S—423 is also the stopping time of the preceding grinding job M—198 which, as indicated by the time-recording hole C, was started at 1.30 P. M. The remaining holes punched in column 34 of card 29 show the starting and stop times of the remaining jobs posted as jobs M—162, S—461, M—98, M—142 and S—619, the calculated time and labor costs chargeable against each job being shown by the manual postings opposite the starting time of the job. The total working hours, pay rate and total labor costs are posted as shown in appropriately headed spaces provided at the bottom of card 29.

The design and assembly of the component parts of the card-punching time recorder provided in accordance with the present invention is illustrated in Figs. 3 to 16 inclusive.

The operating parts of the recorder are enclosed in a housing comprising a cover casing 40 (Fig. 3) detachably secured in any suitable manner to a base plate 41 (Fig. 4) on which said operating parts are mounted as hereinafter described.

A card receiver 42 is rigidly fastened to the upper ends of a pair of guide rods 43 which, in turn, are mounted on base 41 by upper and lower brackets 44 and 45. Card receiver 42 projects upwardly through a top opening of cover casing 40 (Fig. 3) and defines an entrance slot or opening through which an employee's time card, preprinted as shown in Figs. 1 and 2, is inserted in the recorder to operate the card-actuated card punching mechanism hereinafter described.

As the employee's time card is inserted in the recorder by pushing it downwardly through card receiver 42 the side edges of said card are received in guide grooves 46 (Fig. 6) provided in guide rods 43. These grooves guide the inserted card so that it passes downwardly through a slot 47 of a card punching mechanism 48 arranged to slide vertically on guide rods 43.

Card punching mechanism 48 comprises a suitable frame structure 49 including a pair of sectional sleeve bearings 50 which slide vertically on guide rods 43. Each sleeve bearing 50 comprises half sections 51 and 52 secured together in abutting relation at the outer side of the associated guide rod 43 by screws 54 or other suitable fastening means. At the inner side of the associated guide rod 53 the sections 51 and 52 of each bearing 50 are spaced apart to permit the employee's time card to pass therebetween.

A punch holder 55 extends between and is carried by the sections 52 of sleeve bearings 50. The remaining sections 51 of sleeve bearings 50 are connected by a die supporting bar 56, to which a hardened steel die 57 is fastened by fastening screws 58. The punch holder 55 and die 57 are spaced apart to define the previously mentioned card-receiving slot 47.

Punch holder 55 carries 14 laterally spaced, card piercing punches 59 arranged in a horizontal row. These punches are slidably supported in guide bores 60 extending horizontally through punch holder 55 in line with punch receiving holes 61 provided in the die 57 and its supporting bar 56. The punches 59 are normally held in a retracted position clear of the card receiving slot 47 of the punching mechanism by means of biasing springs 64 (Figs. 8 and 7), each having its lower end fastened to a lower portion of the frame structure 49 and its upper end fastened to one of the punches 59 and arranged to work in a cut-out portion 65 of punch holder 55.

Each punch 59 is adapted to be projected across slot 47, through the employee's time card, and into an aligned punch receiving opening 61 of the die 57 by one of fourteen push pins 67 carried by a rotatably mounted punch selecting cylinder 68. The push pins 67 are spiralled around cylinder 68 so that each push pin lies in the vertical plane of the punch 59 operated thereby. The punch selecting cylinder 68 is carried by shaft 69 which is rotatable to selectively shift any one of the push pins 67 to a punch operating position in which said pin is disposed in horizontal alignment with the punch 59 to be operated thereby, as shown to advantage in Fig. 8. Shaft 69 is rotatably journalled in the upper portions of the side arms 70 of a rockably mounted yoke 71 and carries a ratchet wheel 72 and an indicator wheel 73, the latter being provided with a circular series of spaces 74 each bearing a legend 75 indicating one of the days of the week. Each of the spaces 74 is also provided with subdivisions 76 and 77 bearing, respectively, A. M. and P. M. designations. Ratchet wheel 72 is operated, as hereinafter described, to turn punch selecting cylinder 68 to its different punch selecting positions and is engaged by a holding pawl 72a. A pointer 73a is attached to one of the bearings 50 and cooperates with indicator 73 to show which of the punches is working during any period of operation.

The lower ends of arms 70 of rocking yoke 71 are pivotally secured to the frame structure 49 as indicated at 78 to provide an axis about which the yoke and the punch selecting cylinder 68 may be rocked toward or away from punch holder 55. When yoke 71 is rocked toward punch holder 55 one of the push pins 67 which has previously been aligned with its punch 59 is forced against the end of said punch to drive it across the slot 47 and through an employee's time card which has been passed downwardly through said slot and thus interposed between the punch holder 55 and the die 57. The yoke 71 is rocked toward punch holder 55 against the resistance of a spring 71a by means of a cam-operated roller 71b which is carried by yoke 71 and rides a cam 71c slidably keyed to a vertically extending rotary shaft 71d. Frame 49 is provided with upper and lower cam shifting portions 79 and 80 between which cam 71c is mounted by bushings 81 so that said cam is thus caused to travel vertically with frame structure 49. A gear 83 (Fig. 5) is fixed to shaft 71d, below bracket 45, and meshes with a rack 84 which is shifted in one direction by a spring 85 and in the opposite direction by a solenoid 86. When solenoid 86 is energized rack 84 is moved against the resistance of spring 85 to rotate shaft 71d and cam 71c in a clockwise direction to thereby swing yoke 71 in the direction of punch holder 55 so that one of the push pins 67 is forced against its punch 59 to punch a hole in the workman's time card which has previously been inserted in the recorder. When solenoid 86 is de-energized rack 84 moves under the influence of spring 85 and rotates shaft 71d and cam 71c in an anti-clockwise direction to permit spring 71a to rock yoke 71 away from punch holder 55 and therefore permit the previously actuated punch 59 to be retracted by its biasing spring 64.

The starting position of the card punching mechanism 48 is at the lower ends of guide rods 43. From this starting position the card punching mechanism is raised a predetermined distance at predetermined intervals of time by a time controlled mechanism including a flexible band 89 which is trained over a pulley 90 carried by bracket 44 and has one end suitably anchored to the card punching mechanism as indicated at 91. The other end of band 89 is anchored to a winding drum 92 mounted to rotate about a stationary supporting shaft 93. Drum 92 contains a spring 94 (Figs. 9 and 16) having one end anchored to a hook 95 carried by said drum and the other end anchored to a hook 96 carried by shaft 93. A removable cover 97 closes an opening in drum 92 through which access is obtained to spring 94. Shaft 93 is supported by a front bracket 98 and a rear bracket 99.

Drum 92 is rigidly secured, by bushing 100, to a cam 101 which also rotates about shaft 93. Cam 101 is formed with a radial face 102 engaged by one end of a driving pawl 103 intermediately pivoted to a ratchet wheel 104 which is also rotatably mounted on shaft 93 and has a cam 105 rigidly secured thereto by bushing 106. A spring 103a holds pawl 103 in driving engagement with cam 101. When ratchet wheel 104 is rotated in a clockwise direction (as viewed in Fig. 9) the driving pawl 103 acts against the radial face 102 of cam 101 to rotate cam 101, bushing 100 and drum 92 in a clockwise direction to thereby wind band 89 on said drum and effect an upward movement of the card punching mechanism 48 along guide rods 43.

Ratchet wheel 104 is provided with 120 teeth corresponding to the 120 time recording spaces into which each of the daily time recording columns of the employee's time cards shown in Figs. 1 and 2 is divided. Ratchet wheel 104 is caused to make a complete revolution in 12 hours by means of a driving pawl 109 which is pivoted to an intermittently operated lever 110 and is held against the ratchet wheel teeth by a spring 111. One end of lever 110 is pivoted to bracket 99 as indicated at 112. The other end of lever 110 carries a roller 113 which underlies a cam 114 and is caused to follow the contour of said cam by a biasing spring 115.

Cam 114 rotates with a shaft 116 equipped with a setting handle 117 which is used for a purpose hereinafter described. Shaft 116 is driven from a shaft 118 (Fig. 11) so that it revolves once every six minutes, thus causing ratchet wheel 104 to be moved the distance of one tooth every six minutes when the high point of cam 114 passes out of engagement with roller 113 and permits spring 111 to pull said roller against the low point of the cam and thus raise lever 110 and pawl 109 relative to ratchet wheel 104. The drum 92 turns with ratchet wheel 104 and winds up the flexible band 89 to thereby raise the card punching mechanism 48 a distance of one-tenth of an inch which corresponds to the distance between the lines which divide the daily entry columns of the employee's time card into 120 spaces, each representing six minutes or one-tenth of an inch in lineal distance.

Shaft 118 is driven by a standard type of synchronous clock motor (not shown) suitably connected therewith. The drive connection between this shaft and shaft 116 comprises pinion 120 fixed to rotate with shaft 118 fixed to rotate with shaft 114 and meshing with a relatively large gear wheel 121 loosely mounted on shaft 116. Gear 121 carries spring pressed pawl 122 which drives ratchet wheel 123 fixed to rotate with shaft 116. Pinion 120 and gear 121 are designed to give a ratio of reduction of speed of 1 to 6 so that shaft 116 makes a complete revolution every six minutes. The pawl and ratchet drive connection between gear 121 and shaft 116 permits shaft 116 and cam 114 to be rotated by handle 117 relatively to gear 121 to change the initial setting of the card punching mechanism 48 and the time indicating clock mechanism hereinafter referred to.

Cam 105 (Figs. 9 and 10) controls a resetting lever 125 having its lower end pivoted to bracket 99 as indicated at 126. A resetting arm 127 has one end pivoted to the upper portion of lever 125 as indicated at 128. The opposite end of resetting arm 127 slides over a supporting member 129 and is yieldingly held down on said supporting member by a spring 130. Arm 127 is also provided with an inclined cam surface 131 and with a laterally projecting trip member 132. Resetting lever 125 (Fig. 9) is held against cam 105 by spring 133 and is provided with an edge recess 134 in which the high portion of cam 105 is received when rotated to a position opposite said recess at the end of each complete revolution of ratchet wheel 104 and drum 92.

When the high point of cam 105 reaches a position opposite recess 134 of resetting lever 125, the latter is pulled to the left by spring 133 and the trip member 132 of resetting arm 127 engages the end 103 of driving pawl 103 to trip said pawl out of driving engagement with the cam 101 to permit ratchet wheel 104 and drum 92 to make a complete revolution in an anti-clockwise direction under the influence of the previously wound drum spring 94 and the weight of the card punching mechanism 48. Resetting lever 125 continues to move to the left after tripping driving pawl 103 out of driving engagement with cam 101 and the inclined cam surface 131 of resetting arm 127 rides up on supporting element 129 to lift trip member 132 clear of pawl 103 to permit said pawl to return to its normal position for engagement with the radial face 102 of cam 101. As the resetting cam 105 continues to rotate it forces the resetting lever 125 and the resetting arm 127 to the right so that the trip member 132 is positioned clear of the path of travel of driving pawl 103 during the next revolution of ratchet wheel 104 in a clockwise direction.

At this point it is deemed advisable to review the operation of the parts referred to in the foregoing description. As previously stated, the starting position of card punching mechanism 48 is at the lower end of guide rods 43. In this position of the card punching mechanism the punches 59 are positioned to punch holes in the lowermost spaces of the daily entry columns of the time card shown in Fig. 1 when said card is inserted in the time recorder. For purposes of description it will be assumed that the work is just beginning and that the time card to be punched is the preprinted pay roll card shown in Fig. 1. In these circumstances, the punch selecting cylinder 68 will be positioned so that the push pin 67 which operates punch 59 lying opposite the lowest space in the A. M. division of the Monday column of the inserted card will be in vertical and horizontal alignment with said punch to force the latter through the inserted card when the yoke 71 carrying cylinder 68 is rocked toward punch holder 55 by the energization of solenoid 86 which, as hereinafter described, is energized by closure of a card actuated switch which is engaged and closed by the time card inserted in the recorder. Since the card printing mechanism 48 is raised a distance of one-tenth of an inch at six minute intervals by the time controlled raising mechanism previously described it will be seen that the particular space in the A. M. division of the Monday column of the card through which the Monday A. M. punch is actually driven will depend on the time at which the card is inserted in the recorder. If, for example, the card shown in Fig. 1 is inserted in the recorder at 7 A. M. the Monday A. M. punch will pierce the lowest space in the A. M. division of the Monday column of the card to indicate a starting time of 7 A. M. If the card is inserted in the recorder at a later time when the punch holder has moved upwardly from its starting position the space in the A. M. division of the Monday column which is pierced by the Monday A. M. punch will be at a higher level and will indicate a later time, corresponding to the actual time at which the card was punched.

The time controlled card punching mechanism 48 continues its intermittent upward travel at six minute intervals until it has completed an upward travel of 12 inches in 12 hours as the result of 120 operations of the cam actuated pawl 109 which drives the ratchet wheel 104 and the drum 92. In this connection it may be noted that the circumference of drum 92 is exactly 12 inches.

When pawl 109 has moved ratchet wheel 104 the distance corresponding to the distance of 119 spaces on the time card, the card punching mechanism 48 will be in its uppermost position at the top of the guide bars 43 so that if the time card be inserted in the recorder at this instant the punch will pierce the last or uppermost time recording space on the time card marked 6.54 P. M. The next operation of pawl 109 will cause the high point of resetting cam 105 to move to a position opposite the recess 134 of resetting lever 125 thereby permitting said lever 125 to swing to the left (Fig. 9) and trip pawl 103 out of driving engagement with cam 101. This permits spring 94 and the weight of the card punching mechanism to turn drum 92 a complete revolution in an anti-clockwise direction during which the card punching mechanism 48 descends to its starting position at the lower ends of the guide rods 43. During this resetting operation the weight of the descending card punching mechanism is balanced by the spring 94.

As the card punching mechanism 48 descends to its starting position the ratchet wheel 72 of punch selecting cylinder 68 is engaged and turned the distance of one tooth by means of a pawl 136 (Figs. 4 and 5) on bracket 45. This causes the punch selecting cylinder 68 to be turned so that another push pin 67 is positioned to operate a punch 59 to punch time recording openings in the P. M. division of the Monday column of the time card (Fig. 1) if the latter is inserted in time recorder during the next 12 hours during which the card punching mechanism is making its second ascent. From this description it will be obvious that each time the card punching mechanism is returned to its starting position the punch selecting cylinder 68 is turned to bring a different punch into play so that provision is thus made for punching time recording holes in both the A. M. and P. M. divisions of each of the double entry time recording columns printed on the card.

As previously stated, the punch operating solenoid 86 is controlled by a switch mechanism arranged to be actuated by the time card (Fig. 1 or Fig. 2) when the latter is inserted in the time recorder. This switch mechanism is generally indicated at 138 in Figs. 5, 14 and 15 and is mounted on bracket 45 between guide rods 43. It comprises upper and lower normally separated spring contacts 139 and 140 provided with rectangular slots 141 and 142 in line with a similar slot 143 in a guide spring 144 overlying the upper spring contact 139. An insulated and normally vertical switch closing trigger 145 extends downwardly through slots 143, 141 and 142 and is provided with a shoulder formation 146 normally overlying the upper surface of switch contact 139 at one end of slot 141. The upper end of trigger 145 is pivoted to an insulating block 147 carried by a depressible card-actuated switch operating spring 148 provided with upwardly directed end portions 149 and 150 terminating in inwardly directed horizontal card engaging portions 161 and 162. The insulating block 147, to which trigger 145 is pivoted, is located close to the upwardly directed end 149 of switch operating spring 148 and carries a biasing spring 163 which bears against trigger 145 to normally hold the trigger in a vertical position against the left hand end of the slot 143 in guide spring 144. Fastening screws 164 extend downwardly through switch actuating spring 148 and into an underlying insulating block 165 located adjacent the upwardly directed end 150. The inwardly directed card engaging portions 161 and 162 of switch actuating spring 148 are vertically offset so that portion 161 is slightly higher than portion 162.

When the time card (Fig. 1 or Fig. 2) is inserted in the card receiver as previously described, the lower end of the card first engages the horizontal end portion 161 of switch actuating spring 148 and depresses the trigger carrying portion of said spring so that the shoulder 146 of trigger 145 depresses the spring contact 139 into engagement with the underlying spring contact 140 and thereby closes a circuit for energizing solenoid 86 so that the rack 84 (as viewed in Fig. 5) is drawn to the right to operate the card punching mechanism as previously described. As the rack 84 travels to the right the end 167a of a circuit breaker arm 167 carried thereby engages the lower end of trigger 145 (Figs. 5 to 14) and swings the trigger to the right so that the shoulder 146 of the trigger is moved to a position over slot 141 and permits spring contact 139 to spring back to its normal circuit opening position in relation to spring contact 140. When the time card is removed from the time recorder the switch actuating spring 148 springs back to its original position in which the shoulder 146 of trigger 145 is positioned above contact spring 139. As the trigger shoulder 146 rises above said spring contact 139 the trigger 145 is swung to the left by its biasing spring 163 to again position shoulder 146 over the portion of spring contact 139 lying at the left of slot 141.

The downward movement of the time card inserted in the recorder is limited by engagement of the lower edge of the card with the inturned horizontal portion 162 of switch actuating spring 148.

A confetti chute 169 (Fig. 4) extends from the card receiver 42 to the bracket 45 in front of the card punching mechanism 48 and is spaced a slight distance from the die-carrying bar 56. This chute is open at the back and is formed by a front wall and rearwardly directed side walls having their lower portions extended forwardly to provide a discharge end 171. When one of the punches 59 is driven through the inserted time card the small piece of confetti punched from the card is forced through the openings 61, the die 57 and die-carrying bar 56 and against the chute 169. As the confietti falls down the chute it drops onto a suitably supported inclined barrier 170 (Fig. 5) which is positioned above the switch mechanism 138 behind the front wall of chute 169 and directs the confetti outwardly through the lower discharge end 171 of the chute.

The chute 155 carries a clock 173 which is visible through a window opening 174 (Fig. 3) provided in the cover casing 40 of the recorder. The minute hand 175 of the clock (Fig. 13) is attached to a pinion 176 meshing with a gear 177 carrying a spring drum 178 to which one end of a clock operating cord 179 is attached. This cord is trained over a pulley 180 carried by chute 169 and has its opposite end fastened, as indicated at 181 (Figs. 4 and 13) to the card punching mechanism 48. The hour hand 182 of the clock is driven by a relatively large gear 183 meshing with a relatively small pinion 184 which rotates with the gear 177 of drum 178. The gearing here described is the conventional type of 12 to 1 reduction gear. A spring 185 contained within the drum 178 is wound up by the drum when the card punching mechanism 48 is moving downwardly to its starting position and thereby tensions the cord 179 so that, during each upward movement of the card punching mechanism, the spring actuated drum 178 serves to drive the minute hand 175 forward a distance of six minutes. The clock described herein differs from the conventional clock (the hands of which revolve substantially continuously in a clockwise direction) in that the pull exerted on the cord 179 during the return downward movement of the card punching mechanism 48 to its starting position causes the hands of the clock to be driven backwards 12 hours. In this connection it may be explained that when the ratchet wheel 104 has been operated 118 times during the upward movement of the card punching mechanism the hands of the clock will show 6.48. Upon completion of the 119th operation of ratchet wheel 104 the hands of the clock will show a time of 6.54. On the 120th operation of the ratchet wheel 104, which results in reversal of the drum 92 and downward movement of the card punching mechanism to its starting position, the clock will show a time of 7.00 o'clock since the hour and minute hands are then revolved backwards 11 hours and 54 minutes.

The confetti chute 169 is preferably provided with inturned confetti retaining side flanges 169a. These side flanges extend close to the inserted time card which, in effect, forms a rear wall of the confetti chute since pieces of confetti which rebound from the chute member 169 will strike against the card and fall down onto the inclined barrier 170.

In the foregoing I have described a preferred embodiment of my invention but it will be understood that various modifications may be resorted to within the scope and spirit of the invention as defined by the appended claims. It is also pointed out that the invention is not limited to the use of time cards of any particular size and that the card punching mechanism and its associated time controlled mechanism may be designed and operated to record any desired fraction of hours. It is also pointed out that the ratchet wheel and drum which control the card punching mechanism can be made of any suitable diameter to record by lineal measurement on a standard tabulating card in whatever fraction of hours is desired.

I claim:

1. In a time recorder of the kind described, shiftable card punching means functioning to punch a starting time indicating hole in a time card inserted in the recorder at the beginning of a working period and to punch a stopping time indicating hole in another portion of said card when the latter is again inserted in the recorder at the end of said working period, time controlled means functioning, at predetermined intervals, to shift said card punching means a predetermined distance in one direction from a predetermined starting position so that the lineal distance between the starting and stopping time indicating holes in the card is determined by and is a measure of the duration of said working period, said time controlled means including provision for automatically returning said card punching means to its starting position after said card punching means has travelled a predetermined distance in a predetermined length of time, time indicating means, and means for operating said time indicating means from said time controlled means during the aforesaid shifting of the card punching means from its starting position, said means for operating the time indicating means including provision for automatically resetting said time indicating means during return of the card punching means to its starting position.

2. In a time recorder of the kind described, shiftable card marking means functioning to mark a starting time indication on a time card inserted in the recorder at the beginning of a working period and to mark a stopping time indication on another portion of said card when the latter is again inserted in the recorder at the end of said working period, and time controlled means for shifting said card marking means a predetermined distance at predetermined intervals so that the lineal distance between the starting and stopping time indications marked on the card is determined by and is a measure of the duration of said working period, said time controlled means for shifting said card punching means comprises a winding drum, a flexible element connected between said card punching means and said drum and adapted to be wound on the latter to effect the aforesaid shifting of said card punching means, a stationary shaft on which said drum is loosely mounted, a coil spring having one end anchored to the drum and the other end anchored to the shaft and adapted to be tensioned when the drum is rotated in a direction to wind the flexible element thereon, a drum driving member through the agency of which the drum is intermittently rotated in a spring tensioning direction until it has made a complete revolution and means functioning to displace the drum driving member to an inoperative position when the drum has made a complete revolution to thereby enable the card punching means and the drum to return to their starting positions.

3. In a time recorder of the kind described, a card receiver including spaced guides between which a card inserted in the recorder is received and guided, a holder arranged to slide along said guides, card marking means carried by said holder, means functioning, in response to insertion of a time card in said recorder to effect a card marking operation of said card marking means, and time controlled means for effecting a step-by-step advancement of said holder from a starting position to a position of final advancement and then returning said holder to its starting position, said time controlled means comprising a continuously revolving main timing shaft, an intermediate shaft, a speed reducing drive through which the intermediate shaft is driven from the timing shaft, a stationary drum shaft, a drum loosely mounted on said drum shaft, drum driving means for turning said drum through a predetermined part of a complete revolution in response to each complete revolution of said intermediate shaft, a coil spring connected between the drum and drum shaft so as to be tensioned during rotation of the drum by said drum driving means, a flexible element connected between the drum and said holder so that said flexible element is wound on said drum during rotation thereof by said drum driving means to effect the aforesaid advancement of said holder, and means for releasing the drum from said drum driving means when the drum has made a full revolution to permit return of the holder and drum to their starting positions.

4. In a time recorder of the kind described, a card receiver including spaced guides between which a time card inserted in said recorder is received and guided, a holder arranged to slide along said guides, card marking means carried by said holder and operable to mark a starting or a stopping time indication on an inserted card, means functioning in response to insertion of a card in said recorder to operate said card marking means, time controlled means for effecting a step-by-step advancement of said holder from a starting position to a final position of advancement on said guides and then returning said holder to its starting position, a time indicating clock, and means, actuated by said holder, for advancing the hands of the clock during advancement of said holder and resetting the hands of the clock during return of the holder to its starting position.

5. A time recorder as set forth in claim 4, including manually operable means for shifting said holder to change its starting position and to preset the hands of the clock to give a desired initial time indication.

6. In a time recorder of the character described, a pair of vertical card guides between which a time card inserted in said recorder is received and supported during a time recording operation, a holder slidably arranged on said guides so as to extend across one side of an inserted card, card marking means carried by said holder, means, operable by a card inserted in the recorder, to operate said card marking means to mark a starting or stopping time indication on the inserted card, and time controlled means for effecting an upward step-by-step advancement of the holder from a starting position to a final position of advancement and then returning said holder to its starting position, said time controlled means comprising a pulley located above the final position of advancement of said holder, a flexible element trained over said pulley and having one end attached to said holder, a winding drum to which the other end of the flexible element is attached, a stationary shaft on which the drum is loosely mounted, a coiled spring connected between said drum and shaft, a cam fixed to rotate with said drum, a ratchet wheel loosely mounted on the drum shaft, a driving pawl engaging said ratchet wheel, means for intermittently operating said pawl to turn said ratchet wheel, a second driving pawl carried by said ratchet and normally disposed in driving engagement with said cam to turn said drum in a direction to wind the flexible element thereon and to tension said spring, and pawl tripping means operating to trip said second pawl out of driving engagement with said cam when the drum has made a complete revolution.

7. A time recorder as set forth in claim 6, in which the means for intermittently operating the first mentioned pawl comprises a pivotally mounted lever carrying said pawl, a timing cam engaging said lever, a spring arranged to hold the lever against the timing cam, and means for rotating said timing cam at a predetermined speed.

8. In a time recorder of the kind described, a card receiver including spaced guides between which a time card inserted in the recorder is received and guided, a holder arranged to slide along said guides, time controlled means for effecting a step-by-step advancement of said holder from a starting position to a final position of advancement and then returning said holder to said starting position, a series of normally retracted card marking elements slidably mounted in the holder in a row extending transversely between said guides, means functioning in response to insertion of a card in said recorder to operate a selected card marking element to a card marking position, and selecting means for preselecting the card marking element which is operated to mark the inserted card said selecting means comprises a cylinder carrying push pins spiralled therearound, there being one push pin for each card marking element, cylinder supporting means arranged to travel with said holder and to support said cylinder for bodily movement toward and away from said card marking elements, and means for turning said cylinder to dispose one of said push pins in a position to operate one of said card marking elements when the cylinder is moved toward said card marking elements.

ALBERT JAMES FINDLAY.

REFERENCES CITED

The following references are of record in the file of this patent:

UNITED STATES PATENTS

| Number | Name | Date |
|---|---|---|
| 810,370 | Follett | Jan. 16, 1906 |
| 978,480 | Pearson | Dec. 13, 1910 |
| 1,059,468 | Johnson | Apr. 22, 1913 |
| 1,812,620 | Braitmayer | June 30, 1931 |